United States Patent
Winoto

(10) Patent No.: US 10,602,513 B2
(45) Date of Patent: Mar. 24, 2020

(54) WIRELESS COMMUNICATION BETWEEN A CONTACT LENS AND AN ACCESSORY DEVICE

(71) Applicant: SPY EYE, LLC, Palo Alto, CA (US)

(72) Inventor: Renaldi Winoto, Los Gatos, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 16/048,089

(22) Filed: Jul. 27, 2018

(65) Prior Publication Data
US 2020/0037313 A1    Jan. 30, 2020

(51) Int. Cl.
*H04W 72/04* (2009.01)
*G02C 11/00* (2006.01)
*G02C 7/04* (2006.01)
*H04W 84/12* (2009.01)

(52) U.S. Cl.
CPC .......... *H04W 72/0446* (2013.01); *G02C 7/04* (2013.01); *G02C 11/10* (2013.01); *H04W 84/12* (2013.01)

(58) Field of Classification Search
CPC . H04W 36/0027; H04W 76/10; H04W 76/11; H04W 76/15; H04W 76/12; H04W 76/22; H04W 28/0263
See application file for complete search history.

(56) References Cited

U.S. PATENT DOCUMENTS

| | | | |
|---|---|---|---|
| 4,495,117 A | 1/1985 | Feurer | |
| 7,701,299 B2 | 4/2010 | Chenakin | |
| 8,608,310 B2 | 12/2013 | Otis | |
| 8,764,185 B1* | 7/2014 | Biederman | G02C 7/04 351/159.02 |
| 8,870,370 B1 | 10/2014 | Otis | |
| 8,917,804 B2 | 12/2014 | Sano | |
| 9,024,727 B1 | 5/2015 | Otis | |
| 9,298,020 B1* | 3/2016 | Etzkorn | G02C 7/04 |
| 9,338,622 B2* | 5/2016 | Bjontegard | H04W 4/029 |
| 9,641,183 B2 | 5/2017 | Wentzloff | |
| 9,783,159 B1* | 10/2017 | Potter | G08B 21/02 |
| 9,854,437 B1 | 12/2017 | Yeager | |
| 9,860,098 B2 | 1/2018 | Wilkerson | |
| 9,933,620 B2 | 4/2018 | Van Heugten | |
| 10,201,297 B1 | 2/2019 | Biederman | |
| 2002/0181417 A1* | 12/2002 | Malhotra | H04W 72/02 370/329 |
| 2006/0232426 A1 | 10/2006 | Sabeta | |
| 2006/0267768 A1 | 11/2006 | Sabeta | |
| 2007/0274626 A1 | 11/2007 | Sabeta | |
| 2010/0065625 A1 | 3/2010 | Sabeta | |
| 2010/0259719 A1 | 10/2010 | Sabeta | |

(Continued)

*Primary Examiner* — Jenee Holland

(74) *Attorney, Agent, or Firm* — North Weber & Baugh LLP

(57) ABSTRACT

A device for communicating data with a contact lens through a communication interface is disclosed. In embodiments of the invention, an accessory device identifies one or more wireless channels to communicate with a contact lens. Scheduling of this wireless communication is performed such that a preferred channel is selected based on noise and/or interference. In certain embodiments, a centralized scheduler, such as a Wi-Fi access point, is used to reserve the preferred channel within the associated wireless network so that clients within the network don't use this channel.

18 Claims, 7 Drawing Sheets

(56) References Cited

U.S. PATENT DOCUMENTS

| | | | |
|---|---|---|---|
| 2011/0028807 A1 | 2/2011 | Abreu | |
| 2011/0084834 A1 | 4/2011 | Sabeta | |
| 2011/0261766 A1* | 10/2011 | Tang | H04W 24/00 370/329 |
| 2012/0030043 A1* | 2/2012 | Ross | G06Q 20/20 705/16 |
| 2012/0063340 A1* | 3/2012 | Waters | G01S 5/0242 370/252 |
| 2012/0155549 A1 | 6/2012 | Oh | |
| 2012/0257585 A1* | 10/2012 | Sydor | H04W 72/082 370/329 |
| 2012/0281181 A1* | 11/2012 | Chen | G02C 7/04 351/159.03 |
| 2013/0242262 A1* | 9/2013 | Lewis | G02B 27/0093 351/209 |
| 2013/0259010 A1* | 10/2013 | Jechoux | H04W 72/02 370/336 |
| 2013/0346168 A1* | 12/2013 | Zhou | G06F 1/163 705/14.4 |
| 2014/0010089 A1* | 1/2014 | Cai | H04W 48/16 370/241 |
| 2014/0143064 A1* | 5/2014 | Tran | A61B 5/0022 705/14.66 |
| 2014/0178029 A1* | 6/2014 | Raheman | H04N 5/772 386/224 |
| 2014/0222462 A1* | 8/2014 | Shakil | G06Q 50/22 705/3 |
| 2014/0240655 A1 | 8/2014 | Pugh | |
| 2015/0053067 A1* | 2/2015 | Goldstein | G02C 11/10 84/609 |
| 2015/0054621 A1 | 2/2015 | Lin | |
| 2015/0057516 A1 | 2/2015 | Mujeeb-U-Rahman | |
| 2015/0119748 A1* | 4/2015 | Lai | A61B 5/0008 600/549 |
| 2015/0156645 A1* | 6/2015 | Ponnuswamy | H04W 24/06 370/241 |
| 2015/0173893 A1* | 6/2015 | Portney | A61F 2/1654 623/5.11 |
| 2015/0235267 A1* | 8/2015 | Steube | G06Q 30/0261 705/14.58 |
| 2015/0261294 A1* | 9/2015 | Urbach | G06F 3/013 345/156 |
| 2015/0281411 A1* | 10/2015 | Markus | G02C 7/04 455/556.1 |
| 2015/0326659 A1* | 11/2015 | Cheng | G06F 13/385 713/170 |
| 2015/0363614 A1 | 12/2015 | Yeager | |
| 2016/0103338 A1* | 4/2016 | Hart | G02C 11/10 351/206 |
| 2016/0174109 A1* | 6/2016 | Yerramalli | H04W 28/26 370/329 |
| 2017/0006632 A1* | 1/2017 | Elliott | H04L 5/0032 |
| 2017/0012972 A1* | 1/2017 | Tanaka | G06F 1/163 |
| 2017/0042480 A1 | 2/2017 | Gandhi | |
| 2017/0093727 A1* | 3/2017 | Chen | H04W 72/1242 |
| 2017/0168322 A1* | 6/2017 | Toner | H03L 7/085 |
| 2017/0338985 A1 | 11/2017 | Wilkerson | |
| 2017/0371184 A1* | 12/2017 | Shtukater | G02C 11/10 |
| 2018/0017814 A1 | 1/2018 | Tuan | |
| 2018/0120568 A1 | 5/2018 | Miller | |
| 2018/0136492 A1* | 5/2018 | An | A61B 5/145 |
| 2018/0149884 A1 | 5/2018 | Miller | |
| 2018/0160321 A1* | 6/2018 | Doherty | H04W 24/02 |
| 2018/0173304 A1 | 6/2018 | Lemoff | |
| 2018/0203252 A1 | 7/2018 | Perozziello | |
| 2018/0203260 A1* | 7/2018 | Blum | G02C 7/04 |
| 2018/0210235 A1* | 7/2018 | Boss | G02C 11/10 |
| 2018/0224669 A1* | 8/2018 | Shtukater | G02C 7/04 |
| 2018/0224671 A1 | 8/2018 | Lemoff | |
| 2018/0249151 A1* | 8/2018 | Freeman | G16H 20/30 |
| 2018/0316224 A1 | 11/2018 | Maynard | |
| 2018/0335836 A1* | 11/2018 | Miller | G06F 3/013 |
| 2018/0348620 A1 | 12/2018 | Miller | |
| 2018/0375703 A1* | 12/2018 | Kellogg | G01S 13/82 |
| 2019/0041663 A1* | 2/2019 | Goldstein | G02B 27/0172 |
| 2019/0050643 A1 | 2/2019 | Ulman | |
| 2019/0132732 A1* | 5/2019 | Bharti | H04W 12/06 |
| 2019/0265473 A1* | 8/2019 | Shahmohammadi | G02B 27/017 |
| 2019/0331937 A1* | 10/2019 | Owens | H02J 50/10 |
| 2019/0332168 A1* | 10/2019 | Weldemariam | G02C 11/10 |

* cited by examiner

400

| Channel State Table 400 ||||
| Channel No. | No. of packets sent to CL | No. of ACKs received from CL | Success Rate |
| --- | --- | --- | --- |
| 1 | 100 | 50 | 50 % |
| 2 | 80 | 60 | 75% |
| ⋮ | ⋮ | ⋮ | ⋮ |
| M | 100 | 71 | 71% |

WIRELESS COMMUNICATION BETWEEN A CONTACT LENS AND AN ACCESSORY DEVICE

A. TECHNICAL FIELD

The present disclosure relates generally to secure electronic systems and methods employed within a wearable contact lens and accessory device. More particularly, the present disclosure relates to systems and methods for transmitting data between contact lenses and an accessory device through Wi-Fi channels or other wireless channels.

B. BACKGROUND

Developments in mobile communications combined with ever-increasing computing power have enabled significant processing and rich real-time feedback to be employed within wearable device systems. Advances in miniaturization have further enhanced wearables by allowing electronic devices and sensors to be located on a human in a continually shrinking footprint. For example, a wearable miniaturized device may be implemented within a contact lens to provide a variety of functions including the ability to communicate with other peripheral accessory devices proximate to the contact lens.

While the individual purposes and functions of these wearable devices differ from device-to-device, aspects of data communication between a contact lens and a peripheral present certain unique challenges. Issues related to wireless signal strength and coding, data buffering, and channel management may be challenging given the limitations of deploying electronics on a contact lens. In addition, if the contact lens is operating within a noisy environment, adjusting to significant and varying interference and noise conditions may be problematic.

Accordingly, what is needed are systems, devices and methods for dynamic wireless communication between a contact lens and an accessory device/peripheral.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

DETAILED DESCRIPTION OF EMBODIMENTS

Figure 1:
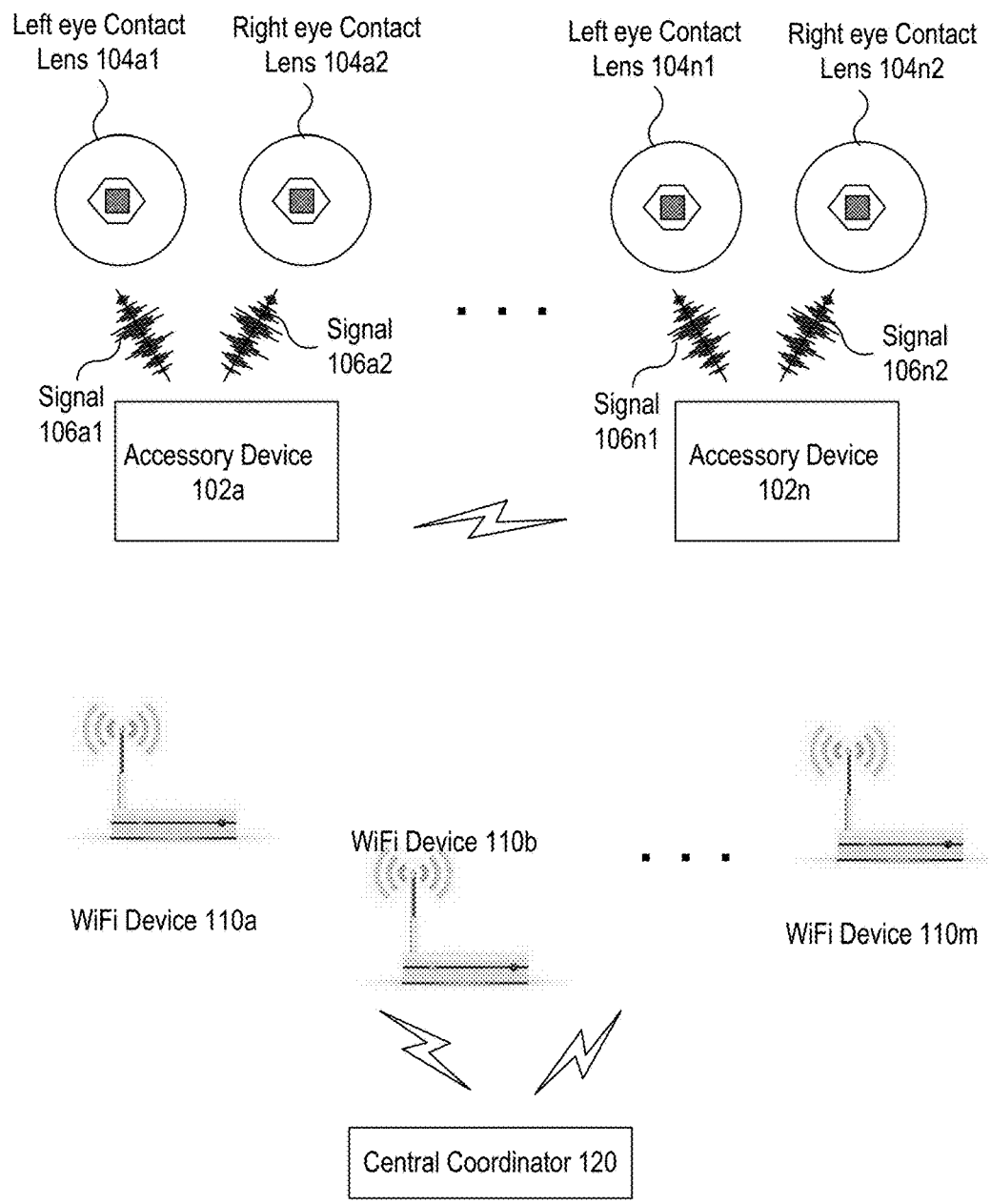
FIG. 1 is a schematic diagram of the overall communication network, according to various embodiments of the present disclosure.

FIG. 1 is a schematic diagram of the overall communication network 100 according to embodiments of the present disclosure. As depicted, the network may include one or more accessory devices 102a-102n that communicate signals 106a1-106n2 with one or more pairs of contact lenses 104a1-104n2 of the wearer. For instance, the accessory device 102a, which is preferably a wearable device, may exchange signals 106a1 and 106a2 to the contact lenses 104a1 and 104a2, respectively. In embodiments, the accessory device 102a may use a downlink channel to send data 106a1 to the contact lens 104a1 and use an uplink channel to receive data from the contact lens 104a1, where the uplink and downlink channels may use the same Wi-Fi time division multiplexed channel, i.e., the accessory device 102a uses a single frequency band for both transmit and receive and shares the band by assigning time slots to transmit and receive operations. One skilled in the art will understand that embodiments of the present invention are not limited to wireless channels defined within the Wi-Fi spectrum and that other frequency bands may be used. One skilled in the art will also understand that embodiments of the present invention support wireless communication between an accessory device and other types of wearables beside contact lenses. For example, the accessory device may wirelessly communicate with hearing aids, heart rate monitors, etc.

Figure 2:
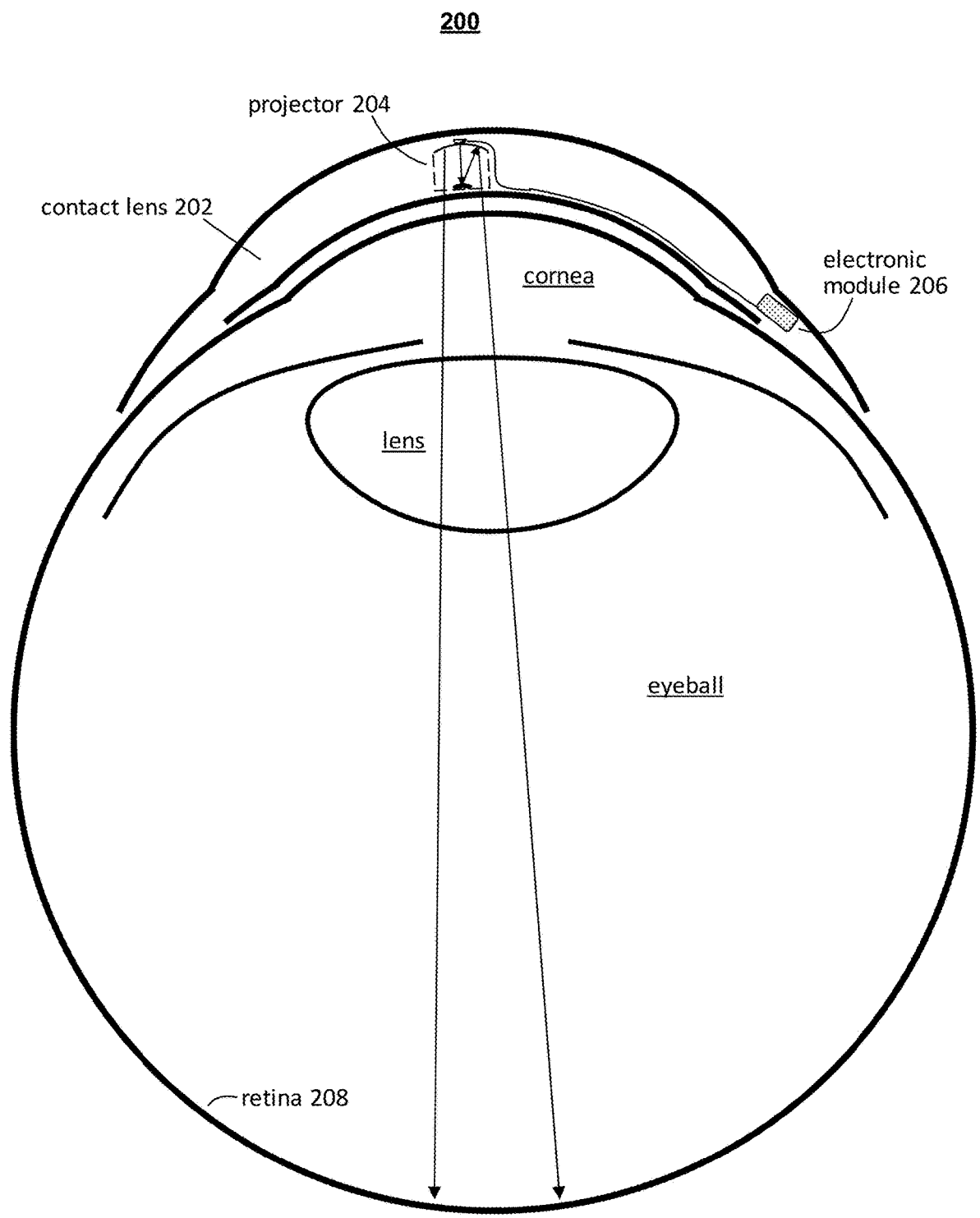
FIG. 2 is a cross-sectional view of the electronic contact lens system, according to various embodiments of the present disclosure.

FIG. 2 is a general illustration of a secure electronic contact lens system according to various embodiments of the present disclosure. Electronic contact lens 202 comprises contact lens material, projector 204 and one or more electronic modules 206. Contact lens material may be made from relatively rigid material that provides sufficient structural support for mounting electronic module(s) 206 on contact lens 202. In certain embodiments, projector 204, depicted in FIG. 2 is a femtoprojector, which is a miniaturized video or image projector and may couple to module(s) 206 that comprise electronic circuits and devices, such as a transceiver circuit, sensors, and data processing devices not shown in FIG. 2. One skilled in the art will recognize that module(s) 206 may perform a variety of functions, some or all of which may require the wireless communication of data between an accessory device and the contact lens.

The accessory device (e.g. 102a) is designed to communicate with contact lens 202 using one or more wireless channels. As previously mentioned, if the wearer of the contact lens 202 is in a noisy and/or crowded environment, then this wireless communication may be problematic. To overcome this problem, various embodiments of the invention employ managed Wi-Fi channels to communicate between contact lens 202 and accessory device 102a. In certain embodiments, the accessory device 102a may coordinate with one or more Wi-Fi wireless access points to reserve Wi-Fi channels within a crowded Wi-Fi environment to enable communication in a preferred frequency band. Coordination within the time domain of this reserved channel may be managed by the accessory device 102a.

In operation, contact lens 202 may be worn like a regular contact lens. Electronic module(s) 206, in turn, may be communicatively coupled to and receive data from an accessory device that, in embodiments, may also be used to provide both power and data to electronic module(s) 206 on contact lens 202. In embodiments, energy may be wirelessly transferred from the accessory device to electronic module(s) 206. For example, the accessory device may produce energy in the form of electromagnetic radiation that can be wirelessly transmitted to circuitry on contact lens 202 (not shown in FIG. 2) and regulated such that a consistent power source is realized locally on the contact lens 202.

It is understood that contact lens 202 in FIG. 2 may be designed to be comfortably worn by using contact lens material that comprises any material known in the art to reduce the likelihood of biological incompatibilities with the wearer's eyes. For example, contact lens 202 may be manufactured using biocompatible, oxygen permeable material that provides sufficient oxygenation to the eye to reduce or eliminate possible irritations of the eye.

Figure 3A:
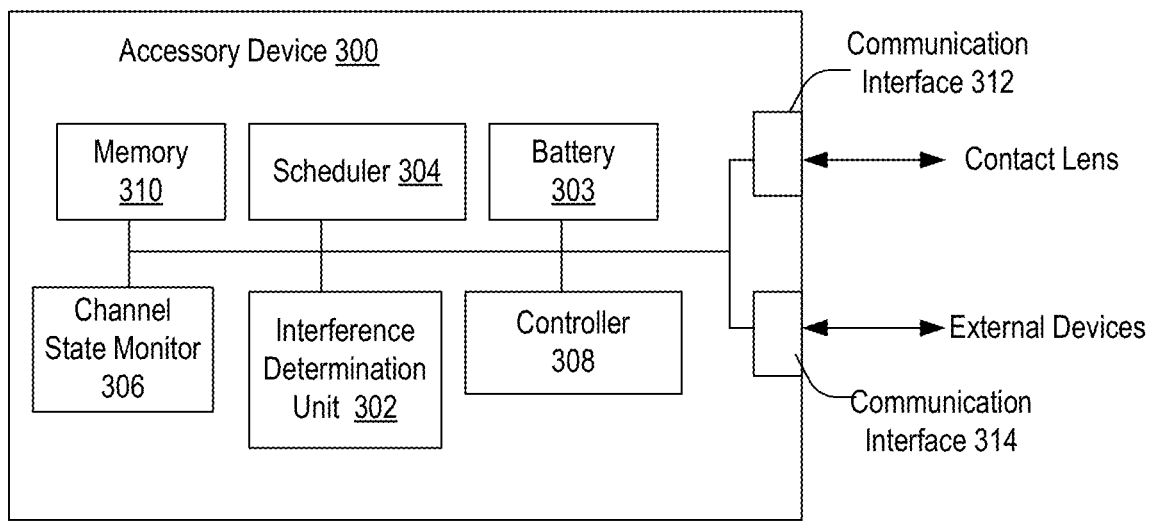
FIG. 3A is a schematic diagram of an accessory device, according to various embodiments of the present disclosure.
Figure 3B:
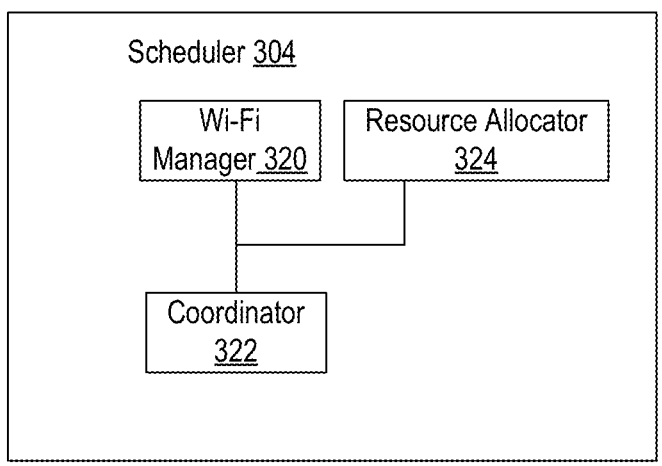
FIG. 3B is a schematic diagram of a scheduler, according to various embodiments of the present disclosure.

FIG. 3A is a schematic diagram of an accessory device 300 according to various embodiments of the present disclosure. FIG. 3B is a schematic diagram of a scheduler 304 included in the accessory device 300 according to various embodiments of the present disclosure. In embodiments, the accessory device 300 may be similar to the accessory devices 102a-102n in FIG. 1. In embodiments, the accessory device 300 may be powered by a battery 303, and the controller 308, such as a micro-processor, may orchestrate operation of the components in the accessory device 300.

In embodiments, the accessory device 300 may remain in a sleep mode to reduce energy consumption and wake up to start communication with the contact lens via a communication interface (port) 312. When accessory device 300 wakes up, the interference determination unit 302 may scan the communication environment to map the noise and interference within its environment. In certain embodiments, this interference mapping is only performed within the Wi-Fi spectrum to check if there is any available Wi-Fi channel for communication with the contact lens. For instance, as depicted in FIG. 1, there may be Wi-Fi devices, such as access points, 110a-110m that each projects Wi-Fi signals to an area where the accessory devices 102a-102n are located. In embodiments, the interference determination unit 302 may check, for each Wi-Fi channel, whether the channel is empty (i.e. not being used) using signals received through a communication interface 314 and, if the channel is being used, the interference determination unit 302 may determine the level of interference in the channel.

In embodiments, the accessory devices 300 may store the scan result in a memory 310 and, optionally send the scan result to the scanners of other accessory devices 102a-102n so that the scan result is shared by the accessory devices within the same proximate location. In embodiments, a communication interface 314 may be used to communicate with external devices, where the external devices collectively refer to devices that communicate signals/data through Wi-Fi channels. For instance, the external devices may include the accessory devices 102a-102n and access points 110a-110m. It is noted that, in embodiments, the accessory device 300 may have a single integrated interface that communicates with all of the external devices or discrete interfaces such as communication interfaces 312 and 314 used to communicate with the contact lens and external devices.

In embodiments, the accessory device 300 may communicate data with the contact lens through the communication interface 312 using an available channel. A scheduler 304 within the accessory device 300 schedules the transmission of data on both the uplink and downlink of the wireless channel. This scheduling will depend on various factors including the interference pattern within the channel, the sensitivity of the data to be transmitted and other factors known to one of skill in the art. In performing this scheduling operation, a coordinator 322 may communicate with other external device(s) that are also transmitting wireless signals within the area. For example, the coordinator 322 may communicate with a Wi-Fi access point to effectively request a Wi-Fi channel for a period of time so that the access point does not transmit to another device during this time period.

Upon agreement with the other external devices, the coordinator 322 may divide the continuous state of the channel into multiple time slots and allocate one or more of the time slots to the resource allocator 324 for communication with the contact lens through the communication interface 312. In embodiments, the resource allocator 324 may determine which data packets need to be transmitted to the contact lens during each allocated time slot, i.e., the resource allocator 324 may schedule transmission of one or more data packets for each allocated time slot. As mentioned above, this scheduling of data may take into account quality of service parameters, data type information (e.g., video vs. static data) and other types of information that may be used to prioritize data to be transmitted.

In embodiments, the Wi-Fi manager 320 may repeat selecting another channel and causing the coordinator 322 to coordinate with external devices until an agreement on sharing the channel between the accessory device 300 and the external devices is reached. In embodiments, the accessory device 300 may appear as a Wi-Fi device when it coordinates with other Wi-Fi devices 110a-110m. For instance, the accessory device 102a may send a request to other devices to hold transmitting signals through the same channel during one or more time slots. If all of the other devices agree, then the accessory device 102a may send the data to the contact lens 104a1 during the time slots. In another embodiment, the accessory device 102a may request an access point to reserve a period of time within the Wi-Fi network during which the access point and/or clients do not transmit. In either approach, the accessory device 102a and contact lens 202 have a Wi-Fi channel within a Wi-Fi network to enable communication with a reduced amount of noise and interference.

In embodiments, the communication network 100 may include a central coordinator 120 that coordinate the communication between the Wi-Fi devices 110a-110m so that the Wi-Fi devices 110a-110m use the channels without collisions. As mentioned above, the accessory device 102a may appear as a Wi-Fi device and communicate with the central coordinator 120 so that the central coordinator 120 may consider the accessory device 102a as another Wi-Fi device and allocate time slots to the accessory device 102a during coordination. In embodiments, the central coordinator 120 may divide the continuous state of each channel into two chunks: (1) content free period during which only one Wi-Fi device may be allowed to transmit a signal through each channel, and (2) contention period during which all of the Wi-Fi devices may attempt to transmit signals with the risk of collision through each channel.

In embodiments, if the scheduler 304 fails to coordinate with other device(s) and cannot find any time slot for communication, the scheduler 304 may select a channel and send the data to the contact lens in two steps: (1) the Wi-Fi manager 320 may send a signal, notifying the contact lens (e.g. 104a1) of the time slot that the contact lens 104a1 can anticipate data from the accessory device 300; and (2) the Wi-Fi manager 320 transmits data to the contact lens 104a1 during the notified time slot in a signal with appropriate strength. In embodiments, Wi-Fi manager 320 transmits the data through the channel, ignoring the interference signal in the selected channel during the notified time slot.

In this non-coordinated wireless transmission method, there may be collisions between the accessory device 300 and the other external device(s). This approach to transmit data to the contact lens (e.g. 104a1) may be opportunistic in time and the contact lens 104a1 may receive the data mixed with an interference signal that is not intended to the contact lens 104a1. To ensure that the contact lens 104a1 receives the data, the Wi-Fi manager 320 may set a time interval, and repeat the following steps until the contact lens 104a1 receives the data within a readable signal: (1) wake up from a sleep mode at the beginning of each time interval, (2) cause the interference determination unit 302 to listen to the channel and send a signal, when the channel is not being used by other Wi-Fi devices, notifying the contact lens (e.g. 104a1) of the time slot that the contact lens 104a1 can anticipate data from the accessory device 300, (3) transmit data to the contact lens 104a1 during the notified time slot, (4) check if the contact lens 104a1 sends an acknowledgement ("ACK") signal that confirms receipt of the data; (5) enter the sleep mode; and (5) repeat steps (1)-(5) until the contact lens 104a1 sends an ACK signal at step (4). When the contact lens 104a1 receives the data without any interference signal, it may send an ACK signal to the accessory device 102a so that the Wi-Fi manager 320 stop repeating the steps (1)-(5).

Figures 4, 5:
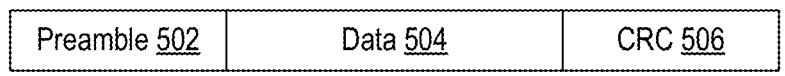
FIG. 4 shows a schematic diagram of a channel state table, according to various embodiments of the present disclosure.
FIG. 5 shows a schematic diagram of a data packet, according to various embodiments of the present disclosure.

In embodiments, the accessory device 300, more specifically, channel state monitor 306 may continuously monitor the state of channels between the accessory device and a contact lens. In embodiments, the channel state monitor 306 may send a reference signal to the contact lens through various channels on a regular basis and check the number of ACK signals that the contact lens sends in response to the reference signals. FIG. 4 shows a schematic diagram of a channel state table 400, according to various embodiments of the present disclosure. As depicted, the first column of the table 400 may represent the list of Wi-Fi channels that may be used by the pair of accessory device and contact lens. In embodiments, the scanner 302 may scan the communication environment to find Wi-Fi channels and enter channels in the first column of the table 400. The second column of the table 400 may represent the number of reference signals that the channel state monitor 306 sent to the contact lens. The third column of the table 400 may represent the number of ACK signals that the channel state monitor 306 received from the contact lens. The fourth column of the table 400 may represent the success rate of transmission. For instance, only 50% of the signals were successfully transmitted to the contact lens when Channel 1 is used for communication. In embodiments, the channel state monitor 306 may continuously send the reference signals to the contact lens and update the table 400.

In embodiments, the channel state monitor 306 may use various types of approaches to check the channel status and update the channel state table. For instance, a cyclic-redundancy-check (CRC) may be used to check if the signal from the accessory device was successfully arrived at the contact lens. Additionally, data encoding may be changed to adapt to a changing noise and interference environment.

In embodiments, the Wi-Fi manager 320 may set a threshold level for the success rate and use channels that have success rates higher than the threshold. In embodiments, the Wi-Fi manager 320 may hop from one channel to another channel if the success rate of the transmission of the first channel falls below the threshold level, i.e., the table 400 is used to establish backup channels for communication.

FIG. 5 shows a schematic diagram of a data packet architecture that may be employed in communication between an accessory device and a contact lens according to various embodiments of the present disclosure. As depicted, the data packet may include a preamble 502, data 504, and CRC 506. As discussed above, the accessory device (e.g. 102a) may appear as a Wi-Fi device to communicate with the Wi-Fi devices 110a-110m. In embodiments, the preamble 502 may include a Wi-Fi header that is compliant with the standard of the Wi-Fi communication so that, upon receipt of the preamble, the Wi-Fi devices 110a-110m may know that the accessory device is sending a Wi-Fi data packet. Stated differently, the format of the preamble 502 conforms to a format of a preamble contained in data packets transmitted by the Wi-Fi devices 110a-110m, i.e., the format of the preamble 502 conforms to the data standard for the Wi-Fi network. In embodiments, the preamble 502 may include information of data 504, such as length of the data, that follows the preamble 502. One skilled in the art will recognize that this data packet architecture may be adapted to various types of networks and communication protocols.

In general, a signal received by a receiver may be different from the signal transmitted by a sender, and the receiver may need to equalize the channel to restore the transmitted signal. In embodiments, the preamble 502 may include a reference signal that the receiver may use to equalize the channel.

In embodiments, the data 504 may include information, such as data for the projector 204, and be formatted according to a proprietary protocol that is implemented for the pair of accessory device and contact lens. In embodiments, CRC 506 may follow the data 504 for error correction.

Figure 6:
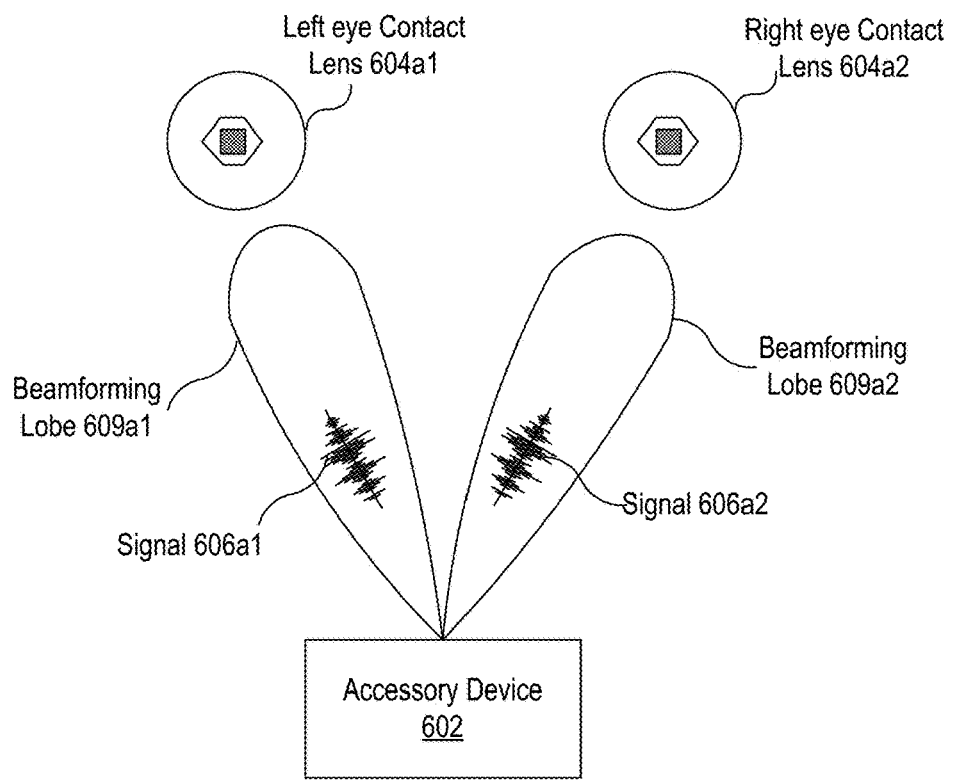
FIG. 6 shows a schematic diagram of a beam pattern generated by an accessory device, according to various embodiments of the present disclosure.

In embodiments, an accessory device may have multiple antennas to beamform the signal transmission. FIG. 6 shows a schematic diagram of a beam pattern generated by an accessory device, according to various embodiments of the present disclosure. In embodiments, the accessory device 502 may have multiple transmission antennas and use the antennas in such a way that the transmission signals from the antennas experience constructive interference at particular angles. As depicted in FIG. 6, the lobe 609a1 shows the power distribution of the downlink signal 606a1 over an azimuthal angle, where the lobe is directed toward the contact lens 504a1. Using the beamforming technique, the accessory device 602 may use less power to deliver the signal 606a1, compared to omnidirectional transmission. In embodiments, the accessory device 602 may transmit the signal 606a1 using the lobe 609a1 to the left eye contact lenses 604a1 and transmit the signal 606a2 using the lobe 609a2 to the right eye contact lenses 604a2. In embodiments, the accessory device 602 may form only one lobe if both the left and right eye contact lenses are located within one lobe. In alternative embodiments, the accessory device 602 may generate one lobe for each contact lens at a point in time if both contact lenses cannot be covered by one lobe. In other examples, the accessory device 602 may generate a single lobe to transmit a signal to both contact lenses.

In embodiments, both the accessory device and each contact lens may use a modulation technique, such as Quadrature Amplitude Modulation (QAM), to encode several bits per transmission step in two dimensions: amplitude and phase. In embodiments, considering the tradeoff between two opposite constraint, performance and complexity, the accessory device and each contact lens may modulate their signals using the 64 QAM technique. One skilled in the art will recognize that various modulation techniques and data rates may be employed within different embodiments of the invention.

An accessory device may communicate with two contact lenses. As such, in embodiments, the accessory device may use the same frequency channel for communication with both contact lenses, where only one contact lens may communicate data with the accessory device at a point in time. In embodiments, the accessory device may schedule both uplink and downlink communications for the two contact lenses and send a scheduling data to each contact lens for both uplink and downlink communications.

In embodiments, the accessory device may send data to the contact lens using two channels; namely, a control channel and a data channel. The scheduler 304 may select a channel and send the data to the contact lens in two steps: (1) the Wi-Fi manager 320 may send a control signal through the control channel, where the control data may notify the contact lens of the time slot during which the contact lens can anticipate data from the accessory device 300; and (2) the Wi-Fi manage 320 may transmit data to the contact lens through the data channel during the notified time slot. In embodiments, the control channel may be the same as the data channel.

In embodiments, an accessory device may have a logical control channel dedicated for sending the control (or, equivalently scheduling) data. In embodiments, the dedicated control channel may be a channel at a fixed frequency. In alternative embodiments, the dedicated control channel may not be a fixed frequency channel. Instead, during the initiation stage, the electronic module 206 of the contact lens 202 may scan channels until it finds a channel that is used by the corresponding accessory device for sending the scheduling data. The corresponding accessory device may send encrypt packets that include the identification (ID) information of the contact lens and the scheduling data through a channel. The contact lens keeps on scanning channels until it finds a channel through which the corresponding accessory device is sending a data packet that matches the contact lens' ID. Upon finding the channel, the contact lens may update its scheduler for the control and data channels.

In embodiments, as depicted in FIG. 1, the accessory devices 102a-102n may coordinate data transmission to the contact lenses 104a1-104n2. For instance, one or more accessory devices may coordinate downlink transmission to send data to a specific contact lens, e.g. 104a1.

Figure 7A:
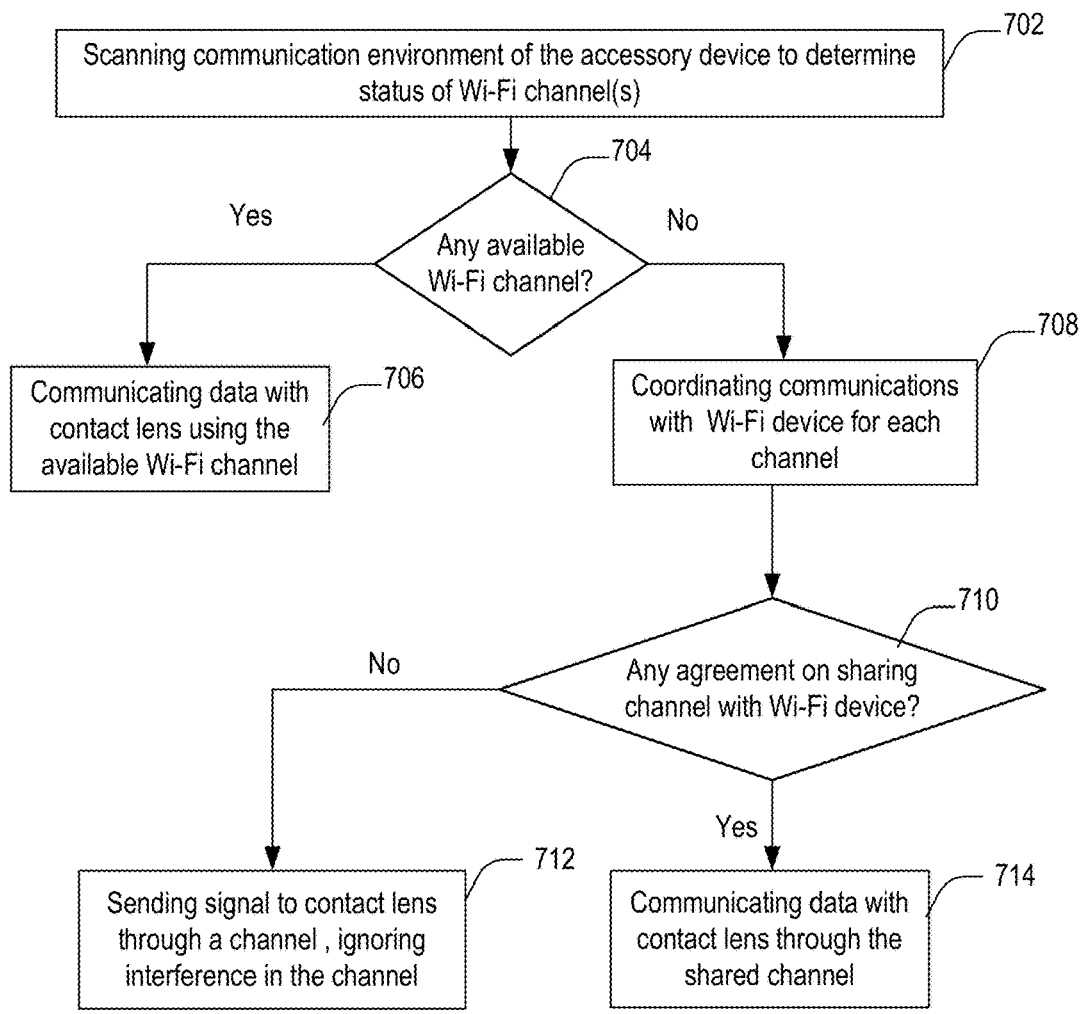
FIG. 7A is a flowchart of an exemplary process for communicating data between an accessory device and a contact lens according to various embodiments of the present disclosure.

FIG. 7A is a flowchart 700 of an exemplary process for communicating data between an accessory device and a contact lens according to various embodiments of the present disclosure. The process starts at step 702. At step 702, the accessory device 300 may wake up from a sleep (low power consumption) mode and the interference determination unit 302 may scan the communication environment of the accessory device 300 to determine the status of Wi-Fi channels. In embodiments, the interference determination unit 302 may check, for each Wi-Fi channel, whether the channel is empty (i.e. not being used) and the interference determination unit 302 may determine the level of interference for the channel. In embodiments, the coordinator 322 may send the scan result to other accessory devices 102b-102n so that the scan result is shared by the accessory devices.

At step 704, the Wi-Fi manager 320 may determine whether there is an empty channel. If the determination at step 704 is positive, the process proceeds to step 706. At step 706, the accessory device 102a may communicate with contact lens, e.g., 104a1, through the empty channel. If the determination at step 704 is negative, the process proceeds to step 708.

At step 708, the coordinator 322 may coordinate communications with Wi-Fi devices 110a-110m. In embodiments, the Wi-Fi manager 320 may select a channel, preferably the channel having the least interference. Then, the coordinator 322 may communicate with the Wi-Fi device(s) that is using the selected channel to determine whether the selected channel can be shared. Upon agreement on sharing the channel, the coordinator 322 may divide the continuous state of the channel into multiple time slots and allocate one or more of the time slots to the resource allocator 324. In embodiments, the Wi-Fi manager 320 may repeat selecting another channel and coordinating with a Wi-Fi device using the channel until an agreement on sharing the channel between the accessory device and the Wi-Fi 110a-110m is reached.

At step 710, the coordinator 322 may determine whether the Wi-Fi-device(s) is willing to grant (or equivalently share) a channel with the accessory device 300. In embodiments, the granting (or sharing) a Wi-Fi channel to (or with) the coordinator 322 may include allocating one or more time slots to the device 300, more specifically to the resource allocator 324. If the determination at step 710 is positive, the Wi-Fi manager 320 may communicate data with the contact lens 104a1 through the shared channel, at step 714. Otherwise, process proceeds to step 712.

At step 712, the Wi-Fi manager 320 may transmit a signal at a preferred power level to the contact lens through a channel, completely ignoring the interference signal in the channel. As the data is transmitted exploiting chances without reference to a predetermined coordination with other Wi-Fi devices, there may be a collision between the accessory device 300 and the other device(s). Stated differently, this approach to transmit data to the contact lens 104a1 may be opportunistic in time and the contact lens 104a1 may receive the data mixed with an interference signal that is not intended to the contact lens 104a1.

Figure 7B:
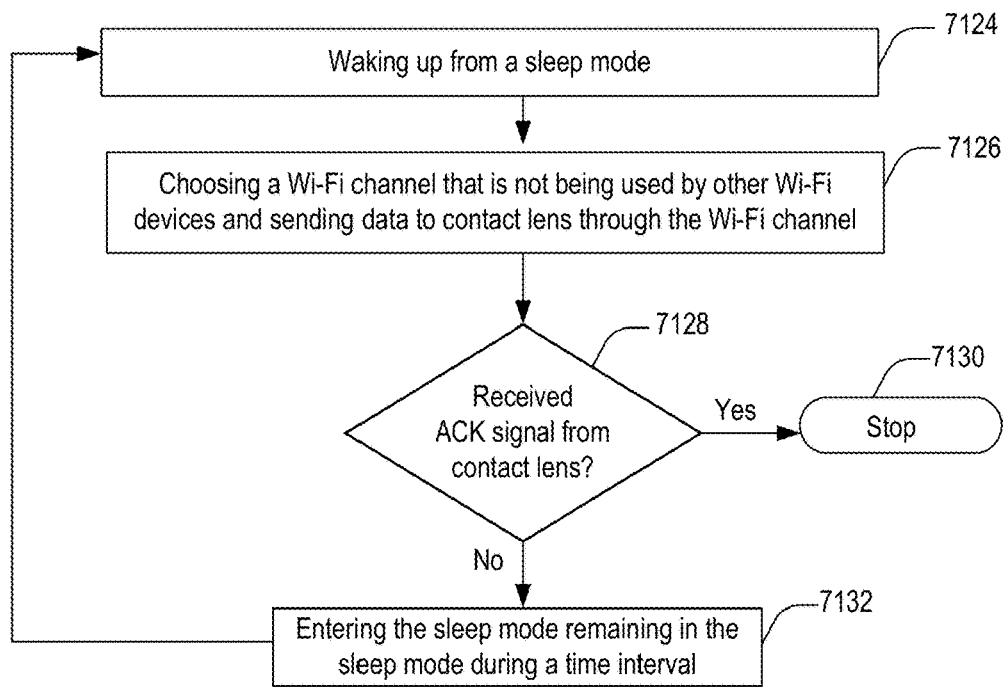
FIG. 7B shows steps that may be included in a step of FIG. 7A according to various embodiments of the present disclosure.

To ensure that the contact lens 104a1 receives the data without any interference signal, the Wi-Fi manager 320 may take several steps. FIG. 7B shows steps that may be included in step 712 in FIG. 7A according to various embodiments of the present disclosure. At step 7124, the interference determination unit 302 may wake up from a sleep mode. At step 7126, the interference determination unit 302 may choose a channel that is not being used by other Wi-Fi devices and send the data to the contact lens 104a1 through the channel. Then, at step 7128, the Wi-Fi manager 320 may check whether an ACK signal that confirms receipt of the data is received from the contact lens 104a1. If the determination at step 7128 is positive, the process stops at step 7130. Otherwise, the Wi-Fi manager 320 may enter the sleep mode and remain in the sleep mode during a time interval at step 7132. Then, the process proceeds to step 7124.

In embodiments, step 7126, the WI-Fi manager 320 may perform two steps to send the data to the contact lens 104a1: (1) cause the interference determination unit 302 to listen to the channel and send a signal through a channel is not being used by other Wi-Fi devices, notifying the contact lens 104a1 of the time slot that the contact lens 104a1 can anticipate data from the accessory device 300, and (2) transmit (blast) data to the contact lens 104a1 during the notified time slot, ignoring the interference in the channel.

Although various embodiments have been described in relation to a Wi-Fi network and associated frequency channels, one skilled in the art will recognize that other types of networks, and scheduling elements therein, may be used in the reservation of one or more channels for use by the accessory device and contact lens. Examples of these other types of networks include LTE, 5G, etc.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

In the preceding description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described above, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

In this document the terms "sensor" refers to any device capable of acquiring information. "Accessory device" may be a wearable device and include communications devices capable of receiving, transmitting, storing, and processing wireless signals to and from a contact lens. This accessory device may be circuitry embedded within jewelry or necklace, a smartphone, an electronic reader, or any other circuitry that is capable of communication with the contact lens.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An accessory device for managing wireless communication with a contact lens, the accessory device comprising:
   a controller;
   a battery coupled to the controller;

a memory coupled to the controller;
an interference determination unit coupled to the controller, the interference determination unit scans a communication environment to determine interference characteristics across a plurality of wireless channels; and
a scheduler coupled to the controller, the scheduler communicates with a Wi-Fi access point and is provided a time window within a wireless channel, the scheduler schedules a communication with the contact lens in the provided time window within the wireless channel, wherein the communication comprises:
scanning a communication environment to determine interference characteristics of a plurality of wireless channels;
communicating with a Wi-Fi access point to coordinate sharing a wireless channel within a Wi-Fi network;
communicating data with a contact lens through a shared wireless channel; and
responsive to failing to share a wireless channel, sending a data packet to the contact lens through a wireless channel that has a least interference, wherein sending the data packet comprises:
waking up from a sleep mode;
choosing a wireless channel that is not being used by a Wi-Fi access point;
sending the data packet to the contact lens through the chosen wireless channel; and
determining whether an acknowledgement signal from the contact lens is received.

2. The accessory device of claim 1, wherein the scheduler comprises:
a coordinator coupled to the controller, the coordinator coordinates requesting the time window within the wireless channel with the Wi-Fi access point; and
a Wi-Fi manager coupled to the controller, the Wi-Fi manager communicates data with the contact lens during the time window within the wireless channel.

3. The accessory device of claim 2, wherein the scheduler comprises:
a resource allocator coupled to the coordinator;
wherein the coordinator allocates one or more time slots of the wireless channel to the resource allocator, and
wherein the resource allocator schedules transmission of one or more data packets to the contact lens for each time slot.

4. The accessory device of claim 3, wherein the data packets comprise a preamble and wherein a format of the preamble conforms to a data standard for the Wi-Fi network.

5. The accessory device of claim 2, wherein the Wi-Fi manager sends a control signal through a control channel, wherein the control signal notifies the contact lens of a time when the contact lens anticipates the data from the device and transmits the data through a data channel at the time.

6. The accessory device of claim 1, further comprising:
a channel state monitor coupled to the controller, the channel state monitor monitors a status of one of the plurality of wireless channels by sending signals to the contact lens through the one of the plurality of wireless channels and counting acknowledgment signals received from the contact lens through the one of the plurality of wireless channels.

7. The accessory device of claim 6, wherein the device sends information of the status of the one of the plurality of wireless channels through a communication interface to share the information with other devices.

8. A method for communicating data between a device and a contact lens through a wireless channel, comprising:
scanning a communication environment to determine interference characteristics of a plurality of wireless channels;
communicating with a Wi-Fi access point to coordinate sharing a wireless channel within a Wi-Fi network;
communicating data with a contact lens through a shared wireless channel; and
responsive to failing to share a wireless channel, sending a data packet to the contact lens through a wireless channel that has a least interference, wherein sending the data packet comprises:
waking up from a sleep mode;
choosing a wireless channel that is not being used by a Wi-Fi access point;
sending the data packet to the contact lens through the chosen wireless channel; and
determining whether an acknowledgement signal from the contact lens is received.

9. The method of claim 8, further comprising, prior to the step of communicating with a Wi-Fi access point:
using information of the interference characteristics, determining whether one of the plurality of wireless channels is empty;
if any one of the plurality of wireless channels is empty, communicating the data with the contact lens using the empty channel; and
otherwise, proceeding to the step of communicating with a Wi-Fi access point.

10. The method of claim 8, wherein the step of sending a data packet to the contact lens through a wireless channel comprises:
if the acknowledgement signal is not received from the contact lens, stopping sending the data packet to the contact lens; and
otherwise, entering the sleep mode.

11. The method of claim 8, further comprising:
sending signals to the contact lens through one of the plurality of wireless channels; and
counting acknowledgment signals received from the contact lens through the one of the plurality of wireless channels to monitor a status of the one of the plurality of wireless channels.

12. The method of claim 8, wherein the step of communicating data with a contact lens includes:
sending a control signal through a control channel, wherein the control signal notifies the contact lens about a time when the contact lens anticipates the data from the device; and
transmitting the data through a data channel at the time.

13. The method of claim 12, wherein the data communicated with the contact lens includes a preamble and wherein a format of the preamble conforms to a data standard for the Wi-Fi network.

14. A non-transitory computer-readable medium or media comprising one or more sequences of instructions for communicating data with a contact lens through a wireless channel, which, when executed by one or more processors, causes steps to be performed comprising:
scanning a communication environment to determine interference characteristics of a plurality of wireless channels;
communicating with a Wi-Fi access point to coordinate sharing a wireless channel within a Wi-Fi network;
communicating data with a contact lens through a shared wireless channel; and responsive to failing to share a wireless channel, sending a data packet to the contact lens through a wireless channel that has a least interference, wherein sending the data packet comprises:
  waking up from a sleep mode;
  choosing a wireless channel that is not being used by a Wi-Fi access point;
  sending the data packet to the contact lens through the chosen wireless channel; and
  determining whether an acknowledgement signal from the contact lens is received.

15. The non-transitory computer-readable medium or media of claim 14, further comprising one or more sequences of instructions, when executed by the one or more processors, causes steps to be performed comprising, prior to the step of communicating with a Wi-Fi access point:
  using information of the interference characteristics, determining whether each of the plurality of wireless channels is empty; and
    if any one of the plurality of wireless channels is empty, communicating the data with the contact lens using the empty channel;
    otherwise, proceeding to the step of communicating with a Wi-Fi access point.

16. The non-transitory computer-readable medium or media of claim 14, wherein the step of sending a data packet to the contact lens comprises:
  if the acknowledgement signal is received from the contact lens, stopping sending the data packet to the contact lens; and
  otherwise, entering the sleep mode.

17. The non-transitory computer-readable medium or media of claim 14, further comprising one or more sequences of instructions, when executed by the one or more processors, causes steps to be performed comprising:
  sending signals to the contact lens through one of the plurality of wireless channels; and
  counting acknowledgment signals received from the contact lens through the one of the plurality of wireless channels to monitor a status of the one of the plurality of wireless channels.

18. The non-transitory computer-readable medium or media of claim 14, wherein the step of communicating data with a contact lens includes:
  sending a control signal through a control channel, wherein the control signal notifies the contact lens about a time when the contact lens anticipates the data from the device; and
  transmitting the data through a data channel at the time.

* * * * *